United States Patent [19]

Mamalis

[11] 3,876,785

[45] Apr. 8, 1975

[54] 4,6-DIAMINO-1,2-DIHYDRO-ARYLMETHOXY-1,3,5-TRIAZINES FOR COMBATING PLASMODIUM PARASITES

[75] Inventor: Patrick Mamalis, Reigate, England

[73] Assignee: Beecham Group Limited, Brentford, England

[22] Filed: Feb. 7, 1973

[21] Appl. No.: 330,283

Related U.S. Application Data

[63] Continuation-in-part of Ser. No. 113,641, Feb. 8, 1971, abandoned, which is a continuation of Ser. No. 781,625, Dec. 5, 1968, abandoned.

[30] Foreign Application Priority Data

Dec. 6, 1967 United Kingdom............... 55414/67

[52] U.S. Cl. ................................. 424/249
[51] Int. Cl. ........................................... H61k 27/00
[58] Field of Search................... 424/249; 260/249.9

[56] References Cited
UNITED STATES PATENTS

| | | | |
|---|---|---|---|
| 2,836,539 | 5/1958 | Cutler................................ | 424/249 |
| 2,976,288 | 3/1961 | Green et al......................... | 424/249 |
| 3,074,947 | 1/1963 | Elsiager et al..................... | 424/249 |
| 3,105,074 | 9/1963 | Mamalis............................. | 424/249 |
| 3,215,600 | 11/1965 | Thompson et al.................. | 424/249 |
| 3,272,814 | 9/1966 | Cutler et al........................ | 424/249 |

*Primary Examiner*—Jerome D. Goldberg

[57] ABSTRACT

Compounds of the formula:

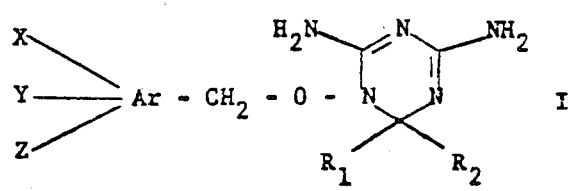

wherein
Ar is phenyl;
X is hydrogen or halogen;
Y is hydrogen or halogen;
Z is hydrogen or halogen;
$R_1$ is lower alkyl of 1 to 4 carbon atoms;

$R_2$ is hydrogen or lower alkyl or 1 to 4 carbon atoms or $R_1$ and $R_2$ may be linked to one another to form a spiro-cyclo-alkane moiety which includes the 2-carbon atom of the triazine ring, or $R_1$ and $R_2$ may be linked together to form a lower alkane spiro-cyclo-alkane moiety including the 2-carbon atom of the triazine ring, said spiro-cyclo-alkane moiety having 5 to 7 carbon atoms and said lower alkyl moiety having 1 to 4 carbon atoms, or pharmaceutically acceptable non-toxic salts thereof have been found to be useful for their anti-malarial activity. They are administered in a general dosage range of 0.7 to 70 mg/kg per day.

16 Claims, No Drawings

4,6-DIAMINO-1,2-DIHYDRO-ARYLMETHOXY-1,3,5-TRIAZINES FOR COMBATING PLASMODIUM PARASITES

This is a continuation-in-part of my copending application Ser. No. 113,641, filed Feb. 8, 1971 now abandoned, which application is a continuation of my application Ser. No. 781,625, filed Dec. 5, 1968, which is now abandoned.

The present invention is concerned with certain novel 4,6-diamino-1,2-dihydro-arylmethoxy-1,3,5-triazines. In addition, the present invention is concerned with pharmaceutical compositions containing 4,6-diamino-1,2-dihydro-arylmethoxy-1,3,5-triazines as the active ingredient, which compositions are useful for the treatment and prevention of malaria. The present invention also includes a method of treating humans for malaria and a method of preventing malaria which comprises administering a 4,6-diamino-1,2-dihydroarylmethoxy-1,3,5-triazine in the general dosage range of 0.7 to 70 mg/kg per day. Pharmaceutically acceptable non-toxic salts are also included in the present invention.

U.S. Pat. No. 2,976,288 in which I am a co-inventor discloses certain triazine derivatives which are stated to be useful as bactericides against such organisms as *Staphylococcus aureus*, *Streptococcus pyogenes*, *Corynebacterium diphtheriae*, *Escherichia coli*, *Pseudomonas aeruginosa*, *Eberthella typhosa* and *Klebsiella pneumoniae*. This patent also discloses methods of producing triazine derivatives, which methods are useful for producing the novel triazines of the present case and for producing the triazines used in the pharmaceutical compositions of the present case and in the methods of treatment.

My U.S. Pat. No. 3,105,074 is concerned with an improved process for the production of triazine derivatives and is useful for producing the triazine derivates disclosed in U.S. Pat. No. 2,976,288, as well as for producing the novel triazines of my present invention, the triazines employed in my pharmaceutical compositions and used in my methods of treating malaria or preventing malaria.

In an article which I co-authored in the *Journal of Medicinal Chemistry*, 8,684 (1965), 0-ethers of 4,6-diamino-1,2-dihydro-1-hydroxy-2-substituted 1,3,5-triazines were described and these compounds were disclosed to have antibacterial activity. The compounds were cited as inhibiting the growth of *Candida albicans* and were active against gram-positive and gram-negative bacteria.

In an article which I co-authored in the *Journal of the Chemical Society*, March 1965, some 0-ethers of 2-substituted 4,6-diamino-1,2,-dihydro-1-hydroxy-1,3,5-triazines were disclosed and a method of preparing these new 0-ethers was described which comprised cyclization of the corresponding diguanides with carbonyl compounds and by 0-alkylation of the corresponding 1-hydroxy-dihydro-triazines. One of the more active compounds was described as having topical antibacterial action comparable with bis-diguanide chlorohexidine and with certain bis-guanidine derivatives described at that time in other articles.

I have now made the surprising discovery that 4,6-diamino-1,2-dihydro-arylmethoxy-1,3,5-triazines and pharmaceutically acceptable salts thereof of the formula:

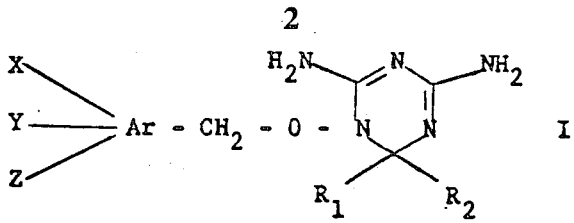

wherein
Ar is phenyl;
X is hydrogen or halogen;
Y is hydrogen or halogen;
Z is hydrogen or halogen, X, Y and Z being the same or different;
$R_1$ is lower alkyl of 1 to 4 carbon atoms;
$R_2$ is hydrogen or lower alkyl of 1 to 4 carbon atoms, and $R_1$ and $R_2$ may be the same or different and may be linked to form a spiro-cyclo-alkane moiety which includes the 2-carbon atoms of the triazine ring or $R_1$ and $R_2$ may be linked to form a lower alkyl spiro-cyclo-alkane moiety, the spiro-cyclo-alkane moiety having 5 to 7 carbon atoms and the lower alkyl part thereof having 1 to 4 carbon atoms, are effective anti-parasitic compounds and particularly the 4,6-diamino-1,2-dihydro-2,2-dimethyl-(di and tri-chlorobenzyloxy)-1,3,5-triazines. In particular, these compounds are useful in treating and preventing malaria. According to my invention, the above compounds are incorporated as the acive ingredient in a pharmaceutical composition which is administered as a treatment of or method of preventing malaria.

My present invention also includes the method of treating or preventing malaria in humans which comprises administering a therapeutically effective amount of such a compound to a patient in need thereof. A therapeuticlly effective amount has been found to be in the range of from 0.7 to 70 mg/kg of the active ingredient per day.

According to my invention, administration can be by any of the normal routes of administration and the oral route is particularly advantageous.

According to the preferred embodiment of my pharmaceutical composition and method of treatment, X, Y and Z are chlorine, bromine or fluorine or 1 or 2 of X and Y are hydrogen and $R_1$ and $R_2$ are each methyl. Preferably at least 2 of X, Y and Z are chlorine. The compound 4,6-diamino-1,2-dihydro-2,2-dimethyl-1-(3,4-dichlorobenzyloxy)-1,3,5-triazine, particularly in the form of the hydrochloride salt, exhibits particularly good activity against malaria.

Also a part of my present invention is the discovery of certain new triazines, which compounds exhibit good antimalarial activity. These compounds and pharmaceutically acceptable non-toxic salts thereof may be represented by the formula:

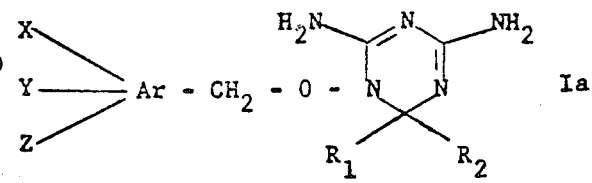

wherein
Ar is phenyl;

X is hydrogen or halogen;
Y is hydrogen or halogen;
Z is hydrogen or halogen, X, Y and Z being the same or different;
$R_1$ is lower alkyl of 1 to 4 carbon atoms;
$R_2$ is hydrogen or lower alkyl of 1 to 4 carbon atoms, $R_1$ and $R_2$ being the same of different, or $R_1$ and $R_2$ are linked with one another to form a spiro-cyclo-alkane moiety including the 2-carbon atom of the triazine ring, or $R_1$ and $R_2$ are linked with one another to form a lower alkyl spiro-cyclo-alkane moiety which includes the 2-carbon atom of the triazine ring, the spiro-cycloalkane moiety having 5 to 7 carbon atoms and the lower alkyl moiety having 1 to 4 carbon atoms, provided that when $R_1$ is hydrogen, methyl or ethyl and $R_2$ is hydrogen, methyl or ethyl,

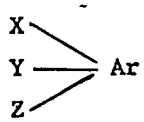

is not 2-chlorophenyl, 2-bromophenyl, 2-fluorophenyl, 4-chlorophenyl, 2-bromophenyl, 4-bromophenyl, 2,4-dichlorophenyl, 3,4-dichlorophenyl, 3,5-dichlorophenyl, or phenyl and further provided that when $R_1$ and $R_2$ are $-[CH_2]_5-$

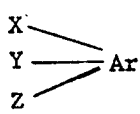

is not 3,4-dichlorophenyl.

The salts of the present invention should, of course, be of relatively low toxicity and the non-toxic or substantially non-toxic acid addition salts are particularly suitable. The compounds are conveniently made in the form of the monohydrohalic acid addition salts, for example, the hydrobromide or the hydrochloride. Other salts may be employed in order to modify the properties of the product, such as its taste or physical properties, such as solubility and absorption. For example, the compounds may be made in the form of the picrate, saccharinate, acetate, acid maleate, acid phthalate, succinate, phosphate, p-nitrobenzoate, stearate, mandelate, N-acetyl-glycinate, pamoate, cyclohexyl sulphamate, citrate, tartrate or gluconate.

Although formulae have been used herein in order to represent the compounds of the prevent invention, the value of the present invention does not depend upon the precise theoretical correctness of these formulae. The names and formulae used herein are not intended to limit the invention to any specific form or to any specific optical or geometric isomer.

The compounds of the present invention may be made by reacting a diguanide of general formula:

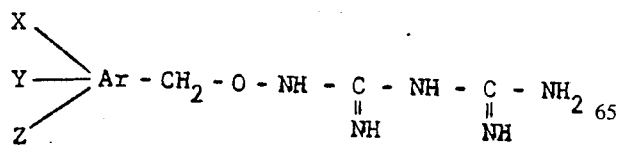

II with a carbonyl compound of general formula:

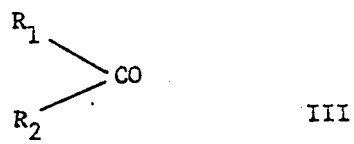

III in the presence of an acid, the symbols having the same meaning as in formula I. Preferably the acid is a strong acid for example, hydrochloric or formic.

The reaction may, in some cases, be carried out without any further solvents or diluents, but usually an inert solvent, such as a lower aliphatic alcohol, e.g., methanol, is preferred. Preferably at least one molecular equivalent of acid is used.

Alternatively, the compounds of the present invention may be prepared by reacting a compound of general formula:

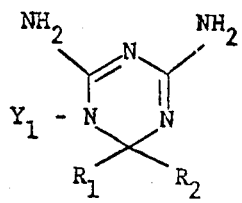

IV wherein $R_1$ and $R_2$ have the meaning ascribed to them in formula I and $Y_1$ is OH or a reactive derivative thereof, with a compound of general formula:

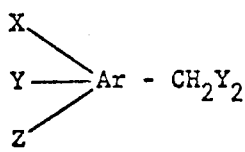

V wherein $Y_2$ is OH or a reactive derivate thereof, for example, chlorine, bromine or iodine and the other symbols have the meanings ascribed to them in formula I, in an inert solvent or diluent, for example, dimethylsulphoxide, dimethylformamide or ethanol.

Preferably $Y_1$ is OH and $Y_2$ is chlorine or bromine.

The triazine derivative IV is usually obtained in the form of an acid addition salt, e.g., the hydrochloride, from which the free base may be liberated by one equivalent of base such as an alkali metal hydroxide, e.g., potassium hydroxide, or sodium in ethanol or methanol or an organic base such as triethylamine. The mixture may then be evaporated and reacted with compound V in a suitable solvent, e.g., dimethylformamide or dimethylsulphoxide. Preferably extra base is not added, since with two equivalents of sodium in alcohol, for example, a less pure product is obtained.

In a modified procedure, usually giving poorer yields, the hydrochloride of compound IV in dimethylformamide or dimethylsulphoxide is reacted with one equivalent of aqueous potassium hydroxide (using as little water as possible) and the resulting mixture treated with compound V ($Y_2$ = halide) to give a triazine hydrohalide.

The novel compounds of the present invention are prepared in a similar manner.

Activity of the compounds of the present invention against malarial parasites has been detected in laboratory screens by use of the rodent malarial parasite *Plasmodium berghe;* in mice. For example, using 4,6-diamino-1,2-dihydro-2,2-dimethyl-1-(3,4-dichlorobenzyloxy)-1,3,5-triazine hydrochloride, complete protection was observed after a single subcutaneous dose of 80 mg/kg of a suspension of the compound in oil given three days after infection. Using 40 mg/kg there were 40–60 percent survivors after 60 days and using 20 mg/kg there were 20 percent survivors. No acute toxicity was observed after subcutaneous doses of 640 mg/kg.

The compounds were also found to protect chicks against the avian malarial parasite *Plasmodium gallinaceum*. In these experiments, 4,6-diamino-1,2-dihydro-2,2-dimethyl-1-(3,4-dichlorobenzyloxy)-1,3,5-triazine hydrochloride was compared with known antimalarials, the compound was found to be 128 times as effective as quinine.

The compound was also found to be active in vitro against the human malarial parasite *Plasmodium falciparum* and relatively active against some strains resistant to chloroquine and cycloguanil. The compound cured monkeys infected experimentally with *Plasmodium cynomolgi*, using oral or subcutaneous dosing schedules. Preliminary tests indicate that the compound will be a potent antimalarial for human use.

Further to these tests against Plasmodium infections, the compoupnd was tested against certain bacteria whose growth depends on folic and folinic acids and which can, therefore, be used to detect antifolic and antifolinic acid activity. The compound was potent against *Lactobacillus casei* and *Pediococcus cerevisiae* (syn. *Pseudomonas cerevisiae*) being ten times more active against the former, which is an unusual difference. It is also highly active against *Streptococcus faecalis* being as active as pyrimethamine and ten times as active as cycloguanil.

Examples of other compounds within the scope of the present invention which display antimalarial activity similar to that described above are: 4,6-diamino-1,2-dihydro-2,2-dimethyl-1-(4-bromobenzyloxy)-1,3,5-triazine, 4,6-diamino-1,2-dihydro- 2,2-dimethyl-1-(2-chlorobenzyloxy)-1,3,5-triazine, 4,6-diamino-1,2-dihydro-2,2-dimethyl-1-(2,4,5-trichlorobenzyloxy)-1,3,5-triazine.

Thus according to one aspect of the present invention, the active compounds of the invention may be employed for the treatment and prevention of malaria in man. They may be used in the form of the free base but preferably they would be used in the form of relatively non-toxic acid addition salts, for example, the hydrochloride. Therefore, one aspect of the invention herein claimed is a method of treatment or prevention of malaria in man which comprises administering one of the said compounds to the person infected or at risk. The compound may be administered orally, parenterally, or by suppository, though the oral route is preferred.

The dose of the compound needed will, of course, depend on the particular salt form used, the route of presentation and whether the compound is being used as a prophylactic, or as a therapeutic dose to give clinical or radical cure of the disease. The oral dose, expressed in terms of the hydrochloride salt, will be in the range of 5 mg to 5 g of the compound daily (equivalent to approximately 0.07 to 70 mg/kg for a 70 kg human): a preferred dosage range is 5 to 600 mg daily.

According to another aspect of the present invention, we proide pharmaceutical formulations for use in the prevention or treatment of malaria, comprising one of the compounds of the present inventin, together with a pharmaceutically acceptable carrier.

As stated above, the compounds of this invention may be administered orally, parenterally or by suppository. The water solublity of the hydrochloride of the compound and most other salts is low and the hydrochloride is non-hygroscopic. If solutions are required, it will be necessary to add solubilizing agents to the water, choose non-aqueous solvents, find a more soluble salt or prepare very dilute solutions. Oral formulations are preferred and with the above proviso in connection with solutions, typical oral formulations will include tablets, pills, capsules, granules, powder, suspensions, emulsions and solutions: particularly preferred oral formulations are tablets and capsules. Where appropriate and where necessary the formulations may include diluents, binding agents, dispersing agents, surface-active agents, lubricating agents, coating materials, flavoring agents, coloring agents, solvents, thickening agents, suspending agents, sweeteners or any other pharmaceutically acceptable additives. Where the formulations are tablets or capsules and the like, they will represent pre-measured unit doses but in the case of granules, powders, suspensions and the like, the formulations may be presented as pre-measured unit doses or in multi-dose containers from which the appropriate unit dose may be withdrawn. The injectable form may be an aqueous or non-aqueous solution, suspension, or emulsion in a pharmaceutically acceptable liquid or mixture of liquids which may contain bacteriostatic agents, antioxidants or other preservatives, buffers, solutes to render the solution isotonic with the blood, thickening agents, suspending agents, or other pharmaceutically acceptable additives. Such forms will be presented in unit dose form such as ampules or disposable injection devices, or in multi-dose forms such as a bottle from which the appropriate dose may be withdrawn, or as a solid form or concentrate which can be used to quickly prepare an injectable formulation. All formulations for injection are preferably rendered sterile. Suppositories containing the compound will also contain suitable carriers.

In addition to standard pharmaceutical additives, there may be included within formulations of the compound, other therapeutic agents, particularly including other antimalarials, e.g., sulphonamides.

Insofar as the formulations are novel, this invention also provides a method of producing them.

Examples of the invention will now be described.

EXAMPLE 1

A mixture of 407.5 g N-(3,4-dichlorobenzyloxy)-diguanide, 1,100 ml methanol, 2,220 ml acetone and 254 ml concentrated hydrochloric acid was stirred for a short time and the clear solution was allowed to stand at room temperature (about 15°C) for three days. The triazine hydrochloride which separated was collected and washed with methanol/acetone mixture (1:2). Drying at 70°C gave 367 g of reasonably pure 4,6-diamino-1,2-dihydro-2,2-dimethyl-1-(3,4-dichlorobenzyloxy)-1,3,5-triazine hydrochloride m.p. 226°C (uncorrected). Concentration to 300 ml, adding 300 ml acetone and allowing to stand gave a second crop of solid (29 g), m.p. 223°–225°C (uncorrected).

EXAMPLE 2

5.5 g of 2,4,5-trichlorobenzyl bromide was added to a mixture of 2.8 g benzhydroxamic acid and 0.78 g sodium hydroxide in 40 ml of methanol. After stirring for 1 hour and leaving overnight 2 crops of crystals were obtained, giving 3.4 g of 2,4,5-trichlorobenzyl benzhydroxamate.

5.1 g of this product were refluxed for 3 hours with 35 ml methanol and 4.4 ml concentrated hydrochloride. After the addition of ether, 3.3 g of 2,4,5-trichlorobenzyloxyamine hydrochloride were obtained.

3.3 g of this product were refluxed for 3 hours with 1.8 g dicyandiamide and 35 ml of ethanol. Most of the solvent was removed and the residue dissolved in 20 ml water. The reaction mixture was made basic with 2N sodium hydroxide and yielded 3.4 g of 2,4,5-trichlorobenzyloxy diguanide.

3.5 g of this product was stirred with 15 ml methanol and 25 ml acetone and 2.7 ml of 48 percent hydrobromic acid for one hour. After leaving overnight, 3.3 g of 4,6-diamino-1,2-dihydro-2,2-dimethyl-1-(2,4,5-trichlorobenzyloxy)-1,3,5-triazine hydrobromide was obtained. (m.p. 225°C)

EXAMPLE 3

To 193.5 g 4,6-diamino-1,2-dihydro-2,2-dimethyl-1-hydroxy-1,3,5-triazine hydrochloride suspended in 2 l. methanol was added a solution of 70 g potassium hydroxide 85 percent) in 500 ml methanol. The mixture was refluxed for 20–30 minutes, evaporated and the residue dried at 70°–80°C. The solid was suspended in 1 l. dimethyl-formamide and stirred while adding 195.5 g 3,4-dichlorobenzyl chloride in 50 ml dimethylformamide over 15 minutes. After stirring at room temperature for 2 hours, the mixture was heated at 80°–100° for 0.5 hours and cooled. Insoluble material was removed by filtration, the filtrate evaporated to dryness, and the residual semi-solid stirred with acetone and cooled at 5° to give after 24 hours a product containing some inorganic material. After washing with water and drying at 90°–100°, there was obtained 250–270 g 4,6-diamino-1,2-dihydro-2,2-dimethyl-1-(3,4-dichlorobenzyloxy)-1,3,5 -triazine hydrochloride, m.p. 228°–230°C (uncorrected).

EXAMPLE 4

To 3.86 g 4,6-diamino-1,2-dihydro-2,2-dimethyl-1-hydroxy-1,3,5-triazine hydrochloride suspended in 35 ml methanol was added a solution of 1.4 g potassium hydroxide (85 percent) in 10 ml methanol. The mixture was refluxed for 20–30 minutes, evaporated and the residue dried at 70°–80°. The solid was suspended in 30 ml dimethyl-formamide and stirred while adding 5.6 g 2,4,5-trichlorobenzyl bromide in 30 ml dimethylformamide. After stirring at room temperature for 2 hours, the mixture was heated at 80°–100° for 0.5 hour and cooled. Insoluble material was removed by filtration, the filtrate evaporated to dryness, and the residual semi-solid stirred with acetone and cooled at 5° to give after 24 hours a product containing some inorganic material. After washing with water and drying at 90°–100°, there was obtained 4.9 g 4,6-diamino-1,2-dihydro-2,2-dimethyl-1-(2,4,5,-trichlorobenzyloxy)-1,3,5-triazine hydrobromide, m.p. 225°–226°C. (uncorrected). Crystallization gave pure material m.p. 225°C.

EXAMPLE 5

Tablets containing 4,6-diamino-1,2-dihydro-2,2-dimethyl-1-(3,4-dichlorobenzyloxy)-1,3,5-triazine hydrochloride as active ingredient. One tabelt contains 10 mg of active ingredient. Dose: Two tablets to be taken three time daily for 3 days, i.e., 60 mg per day.

Then one tablet to be taken twice daily, i.e., 20 mg per day, N.B. The tablet is compressed with embossed punches to produce a breakline, this would allow half doses when required (5 mg).

Formulation for production of 100,000 tablets (approximately 15 kg)

| | |
|---|---|
| Active ingredient | 1,000 grams |
| Maize starch (6–9% moisture limit) | 1,500 grams |
| Gum. Acacia powder | 500 grams |
| Lactose | 8,000 grams |
| Icing sugar | 4,500 grams |
| Talc | 200 grams |
| Magnesium stearate | 100 grams |
| Liquid paraffin | 15 grams |
| Water | approx. 1 liter |
| N.B. Theoretical yield | 100,000 tablets |

METHOD
1. Granulation
  1. Dry starch in a hot air oven at 40°C until moisture is reduced to limit of 6–9 percent w/w.
  2. Sieve each of the powders separately through a 40 mesh sieve.
  3. Place the active ingredient in a planetary mixer and gradually add the lactose with continual stirring.
  4. Add the icing sugar, starch and acacia, mixing for about 5 minutes after each addition, continue to mix for a further 20 minutes.
  5. With constant mixing, add sufficient water until a suitable granule consistency is obtained (approximately 1 liter).
  6. Pass damp granules through a rotary granulator fitted with a 10 mesh screen.
  7. Dry the granules on trays at approximately 50°C.
2. Compression Mixture
  1. Pass the dried granules through a 16 mesh screen.
  2. Sieve sufficient dried granules on a 40 mesh sieve to obtain approximately 500 grams of fines.
  3. Mix the liquid paraffin with the fines and pass through a 20 mesh sieve.
  4. Pass the talc and magnesium stearate through a 20 mesh sieve.
  5. To the bulk of the granules in a planetary mixer add the lubricated fines, followed by the talc and magnesium stearate. Mix thoroughly for at least 10 minutes after each addition, and finally for 20 minutes.
3. Tabletting
  Compress the tablets on a rotary machine using specified punches and limits of thickness.
  Check weight of tablets [10 tablets weigh 1.5 grams]
    Tablets can be spray coated with specified film coating lacquer.

EXAMPLE 6

A 200 mg tablet containing 25 mg of 4,6-diamino-1,2-dihydro-2,2-dimethyl-1-(3,4-dichlorobenzyloxy)-1,3,5-triazine hydrochloride was prepared by dispersing sufficient of the compound in a dry mixture containing dicalcium phosphate (89 percent) starch (7.5 percent) magnesium or calcium stearate (1.0 percent) and microcrystalline cellulose (2.5 percent). Compression provided a tablet which disintegrated very rapidly in water, i.e., in about 30 seconds.

EXAMPLE 7

A tablet of the following composition was prepared:

| | | |
|---|---|---|
| 4,6-diamino-1,2-dihydro-2,2-dimethyl-1-(3,4-dichloro-benzyloxy)-1,3,5-triazine | 25.0 | mg |
| Spray dried Lactose | 151.0 | mg |
| Pregelatinized Starch | 15.0 | mg |
| Maize Starch | 7.5 | mg |
| Magnesium Stearate | 1.5 | mg |
| Tablet weight | 200.0 | mg |

This tablet was prepared by normal compression procedures following a wet granulation process using the customary pharmaceutical techniques. The disintegration time in water was within the normal range not exceeding 15 minutes.

EXAMPLE 8

Formulations suitable for intramuscular injection were made by dissolving 4,6-diamino-1,2-dihydro-2,2-dimethyl-1-(3,4-dichlorobenzyloxy)-1,3,5-triazine hydrochloride in an acceptable pharmaceutical carrier as follows:

a. 0.5 grams of active ingredient were dissolved in a mixture of 95 ml propylene glycol and 5 ml of benzyl alcohol.

b. 0.5 grams of active ingredient were dissolved in a mixture of 47.5 ml propylene glycol 5 ml benzyl alcohol and 47.5 ml water.

Both formulations were made up into 2 ml ampules containing 10 mg of active substance.

EXAMPLES 9–22

The following compounds were made by methods similar to those described in Examples 1 to 4. They display activity against malaria and were incorporated into pharmaceutical formulations by methods similar to those described in Examples 5 and 6.

IN VIVO TEST DATA

Representative triazine compounds of the instant application were evaluated to determine their effectiveness against *Plasmodium berghei* when given subcutaneously and these tests were conducted as follows: Mice were infected with *Plasmodium berghei* and the infection was allowed to develop for 72 hours. A single dose of the test compound was then given subcutaneously. The activity of the compound under test was determined by counting the number of survivors after 60 days. These tests were repeated using various doses in order to determine the effectiveness of the compounds and the results were as follows for compounds of the formula (A)

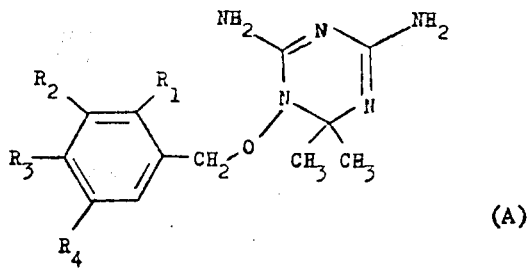

(A)

| Compound | | | | Dose (mg/kg) | % Cure (to nearest 10%) |
|---|---|---|---|---|---|
| $R_1$ | $R_2$ | $R_3$ | $R_4$ | | |
| H | H | Cl | Cl | 80 | 100 |
| Cl | Cl | Cl | H | 320 | 100 |
| H | H | Br | H | 640 | 80 |
| Cl | Cl | H | Cl | 320 | 100 |
| Br | H | H | H | 640 | 40 |
| H | Cl | H | H | 640 | 80 |
| H | H | Cl | H | 640 | 80 |
| G | H | G | G | 160 | 80 |

The above test results show that compounds of formula (A) wherein the phenyl ring is substituted by two or three halogen atoms have better anti-malarial activity than compounds of formula (A) wherein the phenyl ring has only one halogen substituent.

| Example No. | Formula I | | | | | Salt |
|---|---|---|---|---|---|---|
| | X | Y | Z | Ar | $R_1$ | $R_2$ | |
| 9 | 4-Br | H | H | phenyl | $CH_3$ | $CH_3$ | HCl |
| 10 | 2-Cl | H | H | phenyl | $CH_3$ | $CH_3$ | HBr |
| 11 | 3-Cl | 4-Cl | H | phenyl | $(CH_2)_5$ to form cyclohexyl | | |
| 12 | 3-Cl | 5-Cl | H | phenyl | $CH_3$ | $CH_3$ | HCl |
| 13 | 3-Cl | 4-Cl | H | phenyl | $C_2H_5$ | H | HCl |
| 14 | 2-Cl | 4-Cl | H | phenyl | $C_2H_5$ | H | HBr |
| 15 | 2-Cl | 4-Cl | 5-Cl | phenyl | $CH_3$ | $CH_3$ | HBr |
| 16 | 2-Cl | 3-Cl | H | phenyl | $CH_3$ | $CH_3$ | HCl |
| 17 | 2-Cl | 6-Cl | H | phenyl | $CH_3$ | $CH_3$ | HBr |
| 18 | 2-Br | H | H | phenyl | $CH_3$ | $CH_3$ | HBr |
| 19 | 2-F | H | H | phenyl | $CH_3$ | $CH_3$ | HBr |
| 20 | 3-Cl | H | H | phenyl | $CH_3$ | $CH_3$ | HBr |
| 21 | 3-Cl | 4-Cl | H | phenyl | $CH_3$ | $CH_3$ | Saccharinate |
| 22 | H | H | H | phenyl | $CH_3$ | $CH_3$ | HCl |

What is claimed is:

1. A composition in parenteral or suppository form for administration to humans and animals to combat parasites of the genus Plasmodium which comprises an anti-parasitically effective amount of a compound of the formula:

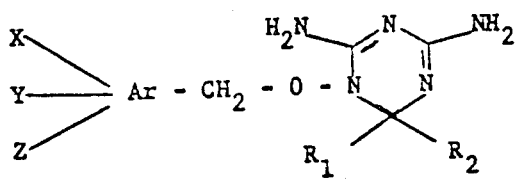

or a pharmaceutically acceptable non-toxic acid addition salt thereof,
wherein
  Ar is phenyl,
  X is hydrogen or chlorine,
  Y is hydrogen or chlorine,
  Z is hydrogen or chlorine, and at least two of X, Y and Z are chlorine, and
  $R_1$ and $R_2$ are each methyl, in combination with a pharmaceutically acceptable non-toxic inert diluent or carier.

2. A composition according to claim 1 in injectable administration form.

3. A composition according to claim 1 in the form of a suppository.

4. A composition according to claim 1, wherein the compound is 4,6-diamino-1,2-dihydro-2,2-dimethyl-1-(3,4-dichlorobenzyloxy)-1,3,5-triazine or a pharmaceutically acceptable nontoxic acid addition salt thereof.

5. A composition according to claim 1, wherein the compound is 4,6-diamino-1,2-dihydro-2,2-dimethyl-1-(3,5-dichlorobenzyloxy)-1,3,5-triazine or a pharmaceutically acceptable nontoxic acid addition salt thereof.

6. A composition according to claim 1, wherein the compound is 4,6-diamino-1,2-dihydro-2,2-dimethyl-1-(2,4,5-trichlorobenzyloxy)-1,3,5-triazine or a pharmaceutically acceptable non-toxic acid addition salt thereof.

7. A composition according to claim 1, wherein the compound is 4,6-diamino-1,2-dihydro-2,2-dimethyl-1-(3,4-dichlorobenzyloxy)-1,3,5-triazine.

8. A composition according to claim 1, wherein the compound is 4,6-diamino-1,2-dihydro-2,2-dimethyl-1-(2,4,5-trichlorobenzyloxy)-1,3,5-triazine.

9. A method of combatting parasites of the genus Plasmodium which comprises administering to a human or animal in need thereof an anti-parasitically effective amount of a composition of claim 1.

10. A method according to claim 9, wherein the administration is oral.

11. A method according to claim 9, wherein the administration is parenteral.

12. A method according to claim 9, wherein the administration is rectal.

13. A method according to claim 9, wherein the compound is 4,6-diamino-1,2-dihydro-2,2-dimethyl-1-(3,4-dichlorobenzyloxy)-1,3,5-triazine or a pharmaceutically acceptable nontoxic acid addition salt thereof.

14. A method according to claim 9, wherein the compound is 4,6-diamino-1,2-dihydro-2,2-dimethyl-1-(3,5-dichlorobenzyloxy)-1,3,5-triazine or a pharmaceutically acceptable nontoxic acid addition salt thereof.

15. A method according to claim 9, wherein the compound is 4,6-diamino-1,2-dihydro-2,2-dimethyl-1-(2,4,5-trichlorobenzyloxy)-1,3,5-triazine or a pharmaceutically acceptable non-toxic acid addition salt thereof.

16. A method according to claim 9 wherein the antiparasitically effective amount is 0.7 mg/kg to 70 mg/kg per day.

* * * * *